Jan. 21, 1964   R. C. O'BRIEN   3,118,354
PHOTOGRAPHIC TYPE COMPOSITION
Filed Sept. 29, 1959   2 Sheets-Sheet 1
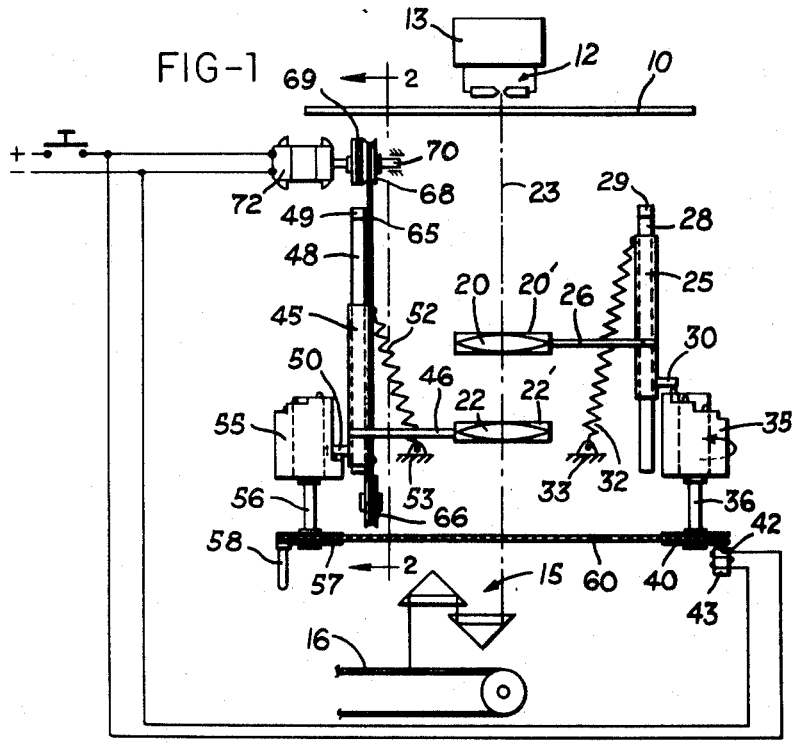
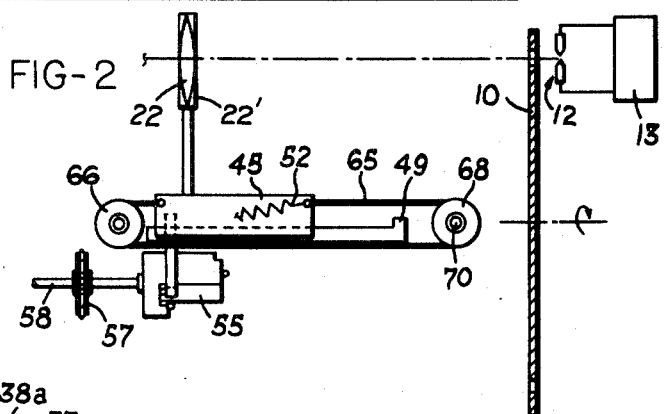
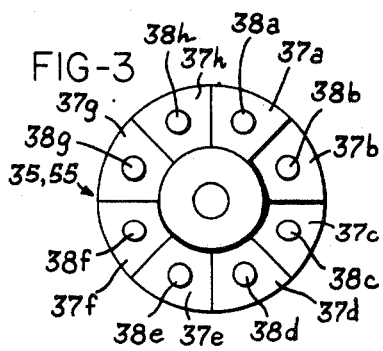
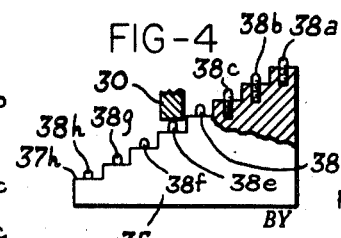
INVENTOR.
RICHARD C. O'BRIEN
ATTORNEYS Jan. 21, 1964     R. C. O'BRIEN     3,118,354
PHOTOGRAPHIC TYPE COMPOSITION
Filed Sept. 29, 1959     2 Sheets-Sheet 2
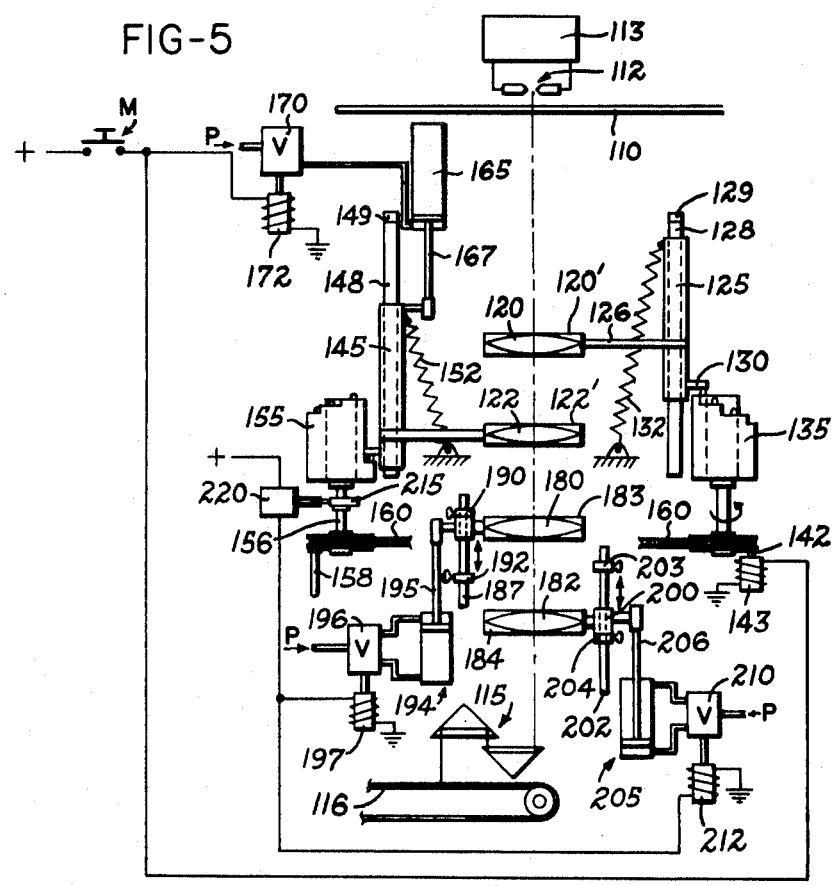
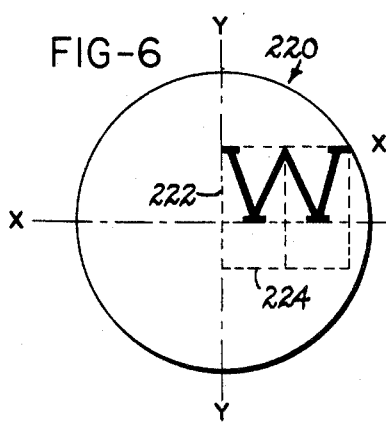
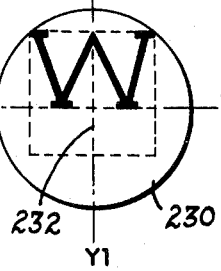
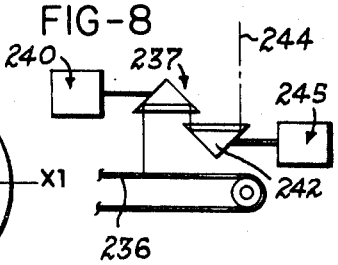
INVENTORS
RICHARD C. O'BRIEN
BY
Marechal, Biebel, Frensch & Bugg
ATTORNEYS

United States Patent Office 3,118,354
Patented Jan. 21, 1964

3,118,354
PHOTOGRAPHIC TYPE COMPOSITION
Richard C. O'Brien, Cleveland, Ohio, assignor to Harris-Intertype Corporation, Cleveland, Ohio, a corporation of Delaware
Filed Sept. 29, 1959, Ser. No. 843,127
3 Claims. (Cl. 95—4.5)

This invention relates to phototypesetting apparatus, particularly to an improved optical system for phototypesetting machines providing for rapid, accurate, and easy adustment of the point size of the individual characters reproduced.

In accordance with this invention the optical system includes simple and inexpensive lenses, as of the ordinary double-convex type, and adjustable mountings for each lens are provided for relative movement of each lens with respect to the others. The mountings are supported adjacent the type matrix of the phototypesetting machine, on the opposite side thereof from a flash source of light which is controlled to illuminate a selected one of the characters on the matrix and thus produce an image bearing light beam. The lenses transmit such beam to photosensitive material which is mounted at a fixed distance from the matrix, defining an optical system in which the image to object distance is a constant. With proper manipulation of the lenses the magnification of the character image focused on the record material may be adjusted as desired within the limits of the system.

In high-speed phototypesetting systems a high intensity short duration light source, such a sa spark gap or a gas discharge tube, is needed for high-speed photography. To obtain long life from such a source it is desirable to keep the energy of each discharge to a minimum, and since the time-light product of the source is a function of the energy in the discharge, an optical system of high efficiency is necessary. An optical system which produces sharp images with a relatively wide lens aperture is necessary to accommodate the range of sizes desired. The present invention provides such a system.

Basically, an optical system in accordance with the present invention may be provided by two simple lenses each having adjustable mountings, together with a coordinated adjustment system which positions each lens accurately in different relative positions according to the desired size change from a basic object member, which may for example be on a character matrix plate or the like. With such a system, using character objects of approximately eleven point size, and with the two lenses operating as a composite lens, with no real image formed therebetween, it is possible to obtain a range of character image sizes from about three and one-half to approximately forty points.

However, in many applications it may be desirable for the machine to produce substantially larger character images, while operating from the same basic eleven point objects. In such case, the two lenses may be positioned differently, with a real image formed between them, or a modified optical system may be provided in accordance with the invention capable of producing character images up to at least seventy-two points. Such a modified optical system may be considered as comprising two separate image forming lens groups. Each group essentially includes two lenses, and the two lenses nearest the character matrix are henceforth called the "main" lenses, operating as a variable composite lens, and the two lenses nearest the image will be called the "auxiliary" lenses. Of the auxiliary lenses, the one nearer the image plane (photosensitive record material) will be referred to as the magnifier or multiplier and the other will be called the field lens.

The use of four lenses in the system provides a much larger range of image sizes, as noted above, and for this purpose the auxiliary lenses are used to provide gross steps of magnification such as 1:1, 2:1 or 4:1. To form an image upon the record material these auxiliary lenses act upon the light from the image formed by the main lenses in the same manner as the main lenses act upon the light from the character matrix. Therefore, with such a main and auxiliary arrangement it is possible to use the adjustments in the main system through one range of settings of the auxiliary system, then to change the gross step by altering the setting of the auxiliary lenses and again utilizing essentially the same settings of the main system to provide a further range of settings within the next gross step of magnification.

Accordingly, the primary object of this invention is to provide an improved and highly efficient optical system for phototypesetting apparatus, which system is relatively inexpensive and easy to manufacture, and which includes easily operated controls for adjusting the system to produce character images of a selected point size.

A further object of this invention is to provide an optical system for phototypesetting apparatus wherein two simple lenses are arranged for relative movement with respect to each other, and to the type matrix and the photosensitive record material which are supported in fixed spaced relation, for focusing character images of a desired point size upon the record material.

Another object of the invention is to provide, in an optical system as outlined above, a control operable from a single location to adjust the positions of the two lenses for focusing a character image of precise selected point size upon the record material.

An additional object of this invention is to provide an improved optical system for phototypesetting apparatus which is constructed of relatively inexpensive and easily obtained parts, whcih may be adjusted to provide desired precise magnifications of projected characters to produce sharply focused character images of precise size corresponding to the point size measurements used in printing, and in which a single easily manipulated control is provided for setting the optical system to produce character images of a desired point size.

Other objects and advantages of the invention will be apparent from the following description, the accompanying drawings and the appended claims.

In the drawings—

FIG. 1 is a somewhat schematic plan view of an optical system and associated control as provided in accordance with the invention;

FIG. 2 is a view taken along line 2—2 in FIG. 1;

FIG. 3 is an enlarged end view in elevation, of one of the rotary stop cylinders shown in FIGS. 1 and 2;

FIG. 4 is a developed view of the stop cylinder shown in FIG. 3, illustrating the relative positions of the various stops on different segments of the stepped end surface thereof;

FIG. 5 is a schematic plan view similar to FIG. 1 showing the modified optical system incorporating main and auxiliary lens groups;

FIG. 6 is a diagram showing one method of locating the character field with respect to the axis of the optical system, providing for proper alignment of the starting or left hand edge of the character field in spite of changes in size of the character image;

FIG. 7 is a view similar to FIG. 6 showing a modified arrangement of the character field with respect to the axis of the optical system; and FIG. 8 is a diagram of a margin adjustment apparatus which would be utilized with the system shown in FIG. 7.

Referring to the drawing, which illustrates a preferred embodiment of the present invention, the optical system provided by this invention and associated parts of a typical phototypesetting machine are shown as including a type matrix 10 which may be in any suitable form, such for example as a continuously rotating disk such as shown and described in the copending application Serial No. 380,802, filed September 17, 1953, now United States Patent No. 2,846,932, which is assigned to the same assignee as this application. The characters on this disk comprise parts of differential light transmitting ability, for example, the character parts being transparent and the background opaque. A selectively operable light source of high intensity and short duration is provided, for example by a pair of spaced electrodes indicated generally at 12 and operable by a suitable control 13 which impresses a high voltage potential difference across the electrodes to produce the desired high intensity spark or flash of light at the instant when a selected character on matrix 10 passes the light source. The resultant character image bearing light beam is directed through the optical system to a suitable spacing prism arrangement indicated generally at 15, and which may be for example the type shown in the copending application Serial No. 661,633, filed May 27, 1957, now United States Patent No. 2,966,835 from which the light beam is directed in properly spaced relation with respect to the preceding light beam upon a strip of photosensitive material or film 16.

The optical system includes a pair of lenses 20 and 22, each of which preferably is of the ordinary positive double convex type, and each supported in a conventional housing, 20' and 22', respectively. These lenses are mounted along the center line of the path between matrix disk 10 and the spacing mechanism 15, defining an optical axis 23 which extends through the center of each of the lenses. Lens housing 20' is mounted on a suitable carrier 25 by an extension arm 26, and carrier 25 is supported in sliding relation upon a track member 28 having a stop 29 at its forward end, and extending parallel to the optical axis 23. A stop arm 30 projects from one side of carrier 25 for engagement with a plurality of selectively operable stops, and a spring 32 is connected at one end to carrier 25 and anchored at a fixed point at its other end 33 so as to urge the carrier against a selected stop.

The selectively operable stop mechanism is provided by cylinder 35 carried on a rotatably mounted shaft 36, and having a plurality of steps $37a-h$ formed along one end thereof in a generally helical pattern, each step carrying an associated adjustable stop pin $38a-h$ which may be threaded or otherwise adjustably fixed with respect to a stop in the end of the stop cylinder.

The development of a suitable stop cylinder is shown in FIG. 4, wherein the progression of the stops with respect to the end of the cylinder and the adjustment of the individual stop pins is readily apparent. Shaft 36 is fixed to a sprocket 40, and a suitable lock pin 42 operated by a solenoid 43 is arranged for projection into suitable apertures (not shown) within sprocket 40 for retaining the stop mechanism at a chosen position.

The other lens housing 22' is mounted on a carrier 45 by a supporting arm 46, and carrier 45 is carried upon a track 48 having a stop 49 at its forward end. In the same manner as previously described, stop 50 projects from one side of carrier 45 for engagement with selectively operated stop means, and a spring 52 is connected at one end to carrier 45 and fixed at its other end 53 for urging this carrier into engagement with the stop means.

The stop means for carrier 45 is provided by a further stop cylinder 55 mounted on a shaft 56 the rotation of which is controlled by a sprocket 57. The details of stop cylinder 55 are exactly the same as those described above in connection with stop cylinder 35. A crank arm 58 extends from sprocket 57 for rotation thereof, and a chain 60 connects the sprockets 40 and 57 to coordinate rotation thereof in response to rotation of crank 58, thereby providing a preselected setting of the stop cylinders 35 and 55 when the crank 58 is moved to a given angular position.

A drive chain 65 is connected at its opposite ends to carrier 45 and is looped around an idler sprocket 66 and a suitable drive sprocket 68 is connected through a suitable slip clutch 69 to a shaft 70 driven by a small electric motor 72 or other suitable driving means. Thus, when motor 72 is energized to rotate shaft 70 in a clockwise direction, as viewed in FIG. 2, lens carrier 45 will be moved forward toward the stop 49.

As lens 22 moves forward its housing engages the housing of lens 20, advancing carrier 25 to engage with its stop 29, at which time clutch 69 will slip. With the two carriers in a forward position and solenoid pin 42 retracted, crank 58 can be rotated to set the stop cylinders 35 and 55. Then, with the stops set as desired the control may be deenergized and the springs 32 and 52 will retract the lens carriers into engagement with their respective selected stop pins. It will be apparent that in this manner the location of each of the lenses 20 and 22 with respect to matrix 10 can be adjusted, and at the same time the distance between the two lenses preselected.

The optical system has a fixed object, the chosen character on matrix 10, and the object to image distance remains constant since there is no movement of the record strip 16 away from the matrix 10. Therefore, for given positions of the two lenses there will be an image focused on record strip 16 which is magnified in accordance with known optical relationships as follows.

In any optical system where F is the focal length, $i$ is the image distance, and $o$ is the object distance, (1) $$\frac{1}{F} = \frac{1}{i} + \frac{1}{o}$$

and where $m$ is the magnification (2) $$o = mi$$

Substituting (2) in (1) yields (3) $$\frac{1}{F} = \frac{1}{i} + \frac{1}{mi}$$

and solving for $i$ gives (4) $$i = F\left(\frac{m+1}{m}\right)$$

Substituting (2) in (4) yields (5) $$o = F(m+1)$$

and adding (4) and (5) gives (6) $$i + o = F\frac{(m+1)^2}{m}$$

In a two lens system the relationship between the focal length of each lens is expressed as follows, where $t$ equals the distance between the two lenses, (7) $$\frac{1}{F} = \frac{1}{f_1} + \frac{1}{f_2} - \frac{t}{f_1 f_2}$$

Then assuming that $f_1$ equals $f_2$ (7) can be reduced and terms combined to give (8) $$F = \frac{f^2}{2f - t}$$

Equation 8 may then be substituted in (6) to yield (9) $$i + o = \frac{f^2(m+1)^2}{m(2f - t)}$$

By cross multiplying (9) gives

(10) $$2f-t=\frac{f^2(m+1)^2}{m(i+o)}$$

and solving (1) for $t$ gives

(11) $$t=2f-\frac{f^2(m+1)^2}{m(i+o)}$$

Considering Equation 11, and recalling that in the phototypesetting apparatus the image to object distance $(i+o)$ is a constant, and realizing that the focal lengths of lenses 20 and 22 will be a constant once chosen, it will be appreciated that variations in magnification $m$ can be accomplished with appropriate changes in the separation distance $t$. Thus, any given setting of stop cylinders 35 and 55 will result in a given selected separation of the lenses 20 and 22 and the desired magnification of the character image focused on film 16.

The foregoing equations and explanation assume that the two lenses are operating as a composite variable power lens in which no real image is formed between the lenses. It is also possible to have a two lens system in which an image to object distance D is fixed and a real image is allowed to form between the lenses, while achieving variable magnification of the object. The total magnification of the system is equal to the product of the magnification $m_1$ of the first lens $L_1$ and the magnification $m_2$ of the second lens $L_2$; i.e., $M=m_1 \times m_2$.

Assuming the following geometrical proportions, the explanation of the system will be apparent. Let D equal the distance between the object (character) plane and the image (record material) plane which for a system of the type herein concerned will be a constant. The distance from the object to $L_1$ will be equal to $a$. The distance from $L_1$ to the first real image $I_1$, between the lenses $L_1$ and $L_2$, will equal $b$. The distance from $I_1$ to $L_2$ will equal $c$, and the distance from $L_2$ to the record plane image $I_2$ will equal $d$.

Fundamental lens equations show that $$m_1=-\frac{b}{a} \text{ and since } \frac{1}{f_1}=\frac{1}{a}+\frac{1}{b}$$

where $f_1$ is the focal length of lens $L_1$, it follows that $$b=\frac{af_1}{f_1-a} \text{ and therefore } m_1=\frac{-f_1}{f_1-a}$$

It follows that the first image $I_1$ will be an inverted real image formed at a distance of $a+b$ from the object, and therefore $$a+b=a+\frac{af_1}{f_1-a}=\frac{2af_1-a^2}{f_1-a}$$

If $a$ is less than or equal to $f_1$, no real image $I_1$ would be formed.

The second lens L must work within the remaining distance $c+d$ to form an image upon the record plane. Therefore, $$c+d=D-\frac{2af_1-a^2}{f_1-a}$$

Since $$m_2=-\frac{d}{c}$$

and since $$\frac{1}{f_2}=\frac{1}{c}+\frac{1}{d}$$

where $f_2$ is the focal length of the second lens $L_2$, $$c=\frac{df_2}{f_2-d} \text{ and } m_2=\frac{-(f_2-d)}{f_2}$$

From the above it follows that $$c+d=d+\frac{f_2-d}{f_2}$$

and it is also true that $$c+d=D-\frac{2af_1-a^2}{f_1-a}$$

as determined by the magnification $m_1$ afforded by lens $L_1$. Thus, the distance $a$ when $f_1$, $f_2$, and D are fixed, as they are in typical embodiments of the invention, will determine the distance $d$ and the magnification $m_2$ of lens $L_2$ as follows.

$$D-\frac{2af_1-a^2}{f_1-a}=d+\frac{f_2-d}{f_2}$$

$$\frac{Df_1-aD-2af_1+a^2}{f_1-a}=\frac{df_2+f_2-d}{f_2}$$

$$\frac{Df_1f_2-Df_2a-2af_1f_2+a^2f_2}{f_1-a}=f_2+d(f_2-1)$$

$$\frac{Df_1f_2-Df_2a-2af_1f_2+a^2f_2-f_1f_2+af_2}{(f_1-a)(f_2-1)}=d$$

The last above equation is a quadratic equation in $a$, and therefore there are two possible values of $a$ for each value of $d$, or conversely two values of $d$ for each value of $a$. Accordingly, there are two values of final magnification M for each usable value of $a$ in a working system of the type above described. The arrangement of a two lens system covering positioning of the lenses whereby a real image is formed therebetween is covered in application Serial No. 253,176, filed Jan. 22, 1963, in the name of Ralph A. Proud, Jr., and assigned to the same assignee as this application.

In coordinating and calibrating the settings of the stop cylinders and each of the associated stop pins, the magnification of the character image may thus be related to a given point size of type, in measurements familiar to the printer, and the angular positions of crank 58 may be related to different point sizes. A suitable indicator (not shown) may then be associated with the crank and the operator may procure a desired point size merely by pressing switch button 75 to release lock pin 42 and start motor 72. This frees the optical system for setting the crank 58 accordingly. When the switch button is released the springs 32 and 52 will return the carriers to be stopped at their respective newly selected positions.

As will be apparent from an inspection of FIG. 1 of the drawing the optical system of this invention may be, in practical use, of relatively short length. This is advantageous from the standpoint that the character images may be sharply and accurately focused upon the photosensitive record material, thereby providing a high quality record which is necessary, for instance, in preparing a galley for use in photolithography or the like.

Furthermore, the accuracy of the system depends, in the case of each point size, upon the final or fine adjustment of the individual stops 38a–h, and thus location of the rotating stop cylinders 35 and 55, once established, does not further effect the optical system. Adjustment of the system by rotation of these cylinders has no effect upon the proper focusing of the images in any given point size, since any slight deviation due to non-parallel mounting between the optical axis and the axes of rotation of the stop cylinders may be compensated for by fine adjustment of the individual stops.

Referring to FIG. 5, a modified system in accordance with the invention is illustrated, with like reference numerals in the 100 series indicating identical or functionally similar parts as described in connection with FIG. 1. In this system, in addition to the main lens system comprising the lenses 20 and 22, there is also an auxiliary lens system comprising two lenses 180 and 182, mounted in housings 183 and 184, respectively. The lens 182, closer to the record material 116 and the image plane, is designated the magnifier or multiplier lens, and the lens 180 is termed the field lens. The use of this additional lens system provides for coverage of a larger range of image sizes in combination with a two lens system where an image is not formed between the lens. The auxiliary lenses are used to provide gross steps of magnification, and for purposes of explanation herein it will be assumed that these lenses occupy alternately each one of two different positions.

The lens housing 183 is mounted on a carrier 186 which in turn slides upon a rod or track member 187, and stop collars or the like 190 and 192 are provided for defining alternate positions of lens 180, with the motive power for changing positions being supplied by a double acting pneumatic motor, or the like, 194 which has its output piston rod 195 coupled to carrier 186 as shown, and which is controlled by a servo valve 196 operated by solenoid 197. The magnifier lens 182 is likewise positioned through its carrier 200 mounted on track 202 and movable between stop collars 203 and 204 under control of a fluid motor 205 which has its output 206 coupled to the carrier 200. The motor 205 is in turn operated by servo valve 210 controlled by the solenoid 212. In the position shown the auxiliary lenses are positioned for 1:1 magnification, or in other words, they have essentially no size controlling effect upon the images passed therethrough. By moving these lenses to their alternate positions, against the respective stops 192 and 203, a gross multiplication or magnification may be obtained as desired, for example magnifying all images passed therethrough by a ratio of 4:1. Incremental changes in image size within the 4:1 range may be accomplished by further adjustment of the lenses in the main system.

Coordination between the two systems is provided by a cam 215 on drum shaft 156, operating to close a normally open switch 220 and to energize solenoids 197 and 212 to provide for shifting of the auxiliary lenses to their "4:1" position as the main lens system, and the control drums therefor, are rotated through a predetermined angular extent. It will be appreciated, of course, that the array of stops on the control drums 135 and 155 may necessarily be in different sequence than that shown for example in FIG. 4, since the main lenses may occupy the same position twice while providing different ultimate magnifications in combination with the auxiliary lens system.

The resetting motor for the main lens system may also be of somewhat different construction, including a single-acting fluid motor 165 having an output piston 167 coupled to the carriage 145. The supply of pressure fluid from a suitable source P is controlled by a solenoid operated valve 170 having an operating solenoid 172 which is energized when the manual switch M is closed, to pass pressure fluid to the motor. In the same manner as previously described in connection with FIG. 1, closing of this switch also energizes the lock solenoid 143 to withdraw the lock pin 142 and permit resetting of the control drums 155 and 135 by rotation of the crank handle 158.

The motor 165 operates in the same manner, withdrawing the carriage 145 to the top, as viewed in FIG. 5, against spring 152 until the housing 122' engages housing 120', after which the carriage 125 is also withdrawn to its base position, defined by stop 129. When the solenoid 172 is subsequently deenergized the motor 165 will be vented to atmosphere through valve 170, in accordance with usual practice, permitting the springs 132 and 152 to advance their corresponding carriages to engage the stops on the control drums at their new settings. The system as shown in FIG. 5, involving use of the auxiliary lenses, is also covered in the aforementioned application of Ralph A. Proud, Jr.

Referring to FIG. 6, the relation between the character field, within which all character images are projected, and the lenses of the optical system, is illustrated. For purposes of explanation, it will be assumed that the lens 220 in FIG. 6 corresponds for example to the lenses 20 or 120 in FIGS. 1 and 5. The optical axes X—X and Y—Y extend through the center of the lens, and the left edge of the character field, indicated by the dot-dash line 222 coincides with the Y—Y axis. The upper case W is used as an illustration, since this character is one of the largest in a font, and occupies essentially the entire upper portion of the field, with the lower edge of the character on the X—X axis.

The bottom line 224 of the character field is somewhat below the X—X axis, to accommodate the descenders of certain characters, particularly the lower case y, p and g. It will be apparent from the drawing that the character field occupies essentially one quadrant of the optical system, with the exception that the descenders above noted extend into the second quadrant. As the lenses are located in different positions, in accordance with any of the mechanisms previously described, the left marginal line 222 of the character field will always remain coincident with the vertical or Y—Y axis of the lens system, and the character images appearing in the final image plane (i.e., on the reproduction material) will always begin on the same left hand or reference line. Thus, particularly with regard to the first character in a line of composition, the characters will always be properly aligned with the left hand margin no matter what optical change may be effected to produce relatively larger or smaller character images.

FIGS. 7 and 8 show a modified arrangement of the character field with reference to the optical system. In this arrangement the optical axes X1—X1 and Y1—Y1 intersect at the center of a lens 230, and the character field is arranged within the optical system having its vertical center line 232 coincident with the Y1—Y1 axis. Therefore, in the case of the upper case W shown, the character will be centered in the upper two quadrants of the system, and descenders would project somewhat into the lower two quadrants. The base of the character will coincide with the X1—X1 axis, with the descenders projecting therebelow. This system permits the use of smaller lenses, but all character images will be centered on the Y1—Y1 axis, and thus the left edge of the character field may be of variable position in the final image plane, depending upon the optical size change produced by the system.

With such a system, it is therefore necessary to adjust the left marginal edge of the character field in accordance with optical changes to maintain coincidence of the left hand margin of the character field in composing different lines and using different size images. A suitable system for this purpose is shown in FIG. 8, wherein the record material 236 may be advanced through large increments, to perform large spacing movements during composition of a line, and where a movable prism 237, or a similar suitable movable reflecting or other member for changing the optical path through small increments, may be variably positioned under the control of a transducer 240 capable of producing small incremental movements within the range between the large movement increments of the record surface 236. One suitable transducer for this purpose is shown in Patent 2,889,108, issued June 2, 1959, and assigned to the assignee of this application.

The aforementioned adjustment of the character field to accommodate different optical changes (in a system such as shown in FIG. 7) is accomplished by another variably movable prism 242 (or a suitable equivalent) which is capable of assuming a number of different incremental positions with reference to the longitudinal optical axis 244 of the lens system, thereby varying the location of the character image as it passes through the small increment spacer 237. The member 242 may likewise be under the control of a transducer 245 having essentially the same construction as the transducer 240, and controlled in any suitable manner to produce the necessary adjustment in the member 242.

This application is a continuation-in-part of application Serial No. 691,851, filed October 23, 1957, in the name of Richard C. O'Brien, now abandoned.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In phototypesetting apparatus having a matrix carrying a plurality of characters, a selectively operable device providing a flash source of light having relatively high intensity and relatively short duration, means supporting said matrix adjacent said light source to illuminate the characters individually in selected sequence and to produce successive light beams bearing images of the selected characters, means conducting said light beams along a common predetermined path, means for supporting a photosensitive record material on said path in an image plane at a fixed distance from said matrix for recording of the character images thereon, a pair of lenses, individual carriers for each of said lenses supporting said lenses in spaced relation along said path between said matrix and said record supporting means, means defining paths of movement for each of said carriers parallel to said path of said light beams, selectively operable stop means for each of said carriers cooperating therewith to position said carriers at a plurality of locations along their respective paths of movement, and coordinating control means operative on said stop means to select combinations of settings of said stop means corresponding to predetermined different separations of said lenses.

2. Apparatus as defined in claim 1, wherein said stop means are arranged with respect to each other such that said lens carrier and said lens mounted thereon are positioned in the respective settings of said stop means to effect the selected change in size of the character images without forming a real image between said lenses.

3. In phototypesetting apparatus having a matrix carrying a plurality of characters, a selectively operable device providing a source of light having relatively high intensity and relatively short duration, means supporting said matrix and said light source in position to illuminate selected ones of said characters to produce successive light beams each bearing an image of a single selected character, means conducting said light beams along a common predetermined path, means for supporting a photosensitive record material on said path in an image plane at a fixed distance from said matrix for recording of the character images thereon, a pair of lenses, a separate carrier for each said lens, means supporting said carriers with said lenses arranged in series to define an optical axis, means included in said supporting means providing for independent movement of said carriers along said optical axis to adjust the separation distance between said lenses, a stop cylinder for each said carrier having stepped stop members arranged in a predetermined pattern about one end thereof, means supporting said cylinders with each of said stop members extending adjacent to the path of movement of its associated carrier, means on each of said carriers engageable with a selected one of said stop members to define positions of the associated lenses along the optical axis, means for rotating said cylinders to place selected said stop members in position to engage said carriers, and means for retaining said carriers in the selected positions defined by said stop members to produce a corresponding desired size of all the images projected along said path.

References Cited in the file of this patent

UNITED STATES PATENTS

| | | |
|---|---|---|
| 2,159,394 | Mellor | May 23, 1939 |
| 2,356,620 | Schade | Aug. 22, 1944 |
| 2,670,665 | Caldwell | Mar. 2, 1954 |
| 2,682,814 | Higonnet | July 6, 1954 |
| 2,691,924 | Plastaras | Oct. 19, 1954 |
| 2,841,062 | O'Brien | July 1, 1958 |